United States Patent [19]

Christensen et al.

[11] 3,754,378

[45] Aug. 28, 1973

[54] APPARATUS FOR REMOVING DUST FROM AN AIR STREAM

[75] Inventors: Kenneth M. Christensen; Howard E. Bauman, both of Hopkins; Robert G. Walker, Minneapolis, all of Minn.; Bob K. Davis, deceased, late of Minneapolis, Minn.; D. Kenneth, administrator Lindgren, Jr., Hopkins, Minn.

[73] Assignee: The Pillsbury Company, Minneapolis, Minn.

[22] Filed: Sept. 8, 1971

[21] Appl. No.: 178,808

Related U.S. Application Data

[63] Continuation of Ser. No. 764,043, Sept. 27, 1968, abandoned.

[52] U.S. Cl............................ 55/91, 55/96, 55/233, 55/290, 55/300, 55/512, 261/92
[51] Int. Cl............................................ B01d 46/36
[58] Field of Search................ 55/96, 91, 234, 233, 55/300, 512, 290; 261/92

[56] References Cited
UNITED STATES PATENTS

| | | | |
|---|---|---|---|
| 258,099 | 5/1882 | Mills | 55/290 |
| 2,941,872 | 6/1960 | Pilo et al | 55/400 |
| 3,306,591 | 2/1967 | Valazza | 261/92 |
| 3,520,066 | 7/1970 | Meade | 55/400 |

FOREIGN PATENTS OR APPLICATIONS

| | | | |
|---|---|---|---|
| 109,855 | 4/1900 | Germany | 55/234 |

Primary Examiner—Bernard Nozick
Attorney—Ronald E. Lund, James V. Harmon and Michael D. Ellwein

[57] ABSTRACT

To remove dust from an air stream, a filter has been devised which consists of a filtration bed composed of a multiplicity of granules that are coated with a thin film of dust-trapping liquid (normally water). The air stream containing dust particles is forced through the wetted bed until the liquid film is nearly evaporated. The granules in the bed are then subjected to violent agitation to shake the accumulated dust from their surfaces into an auger conveyor which removes the dust to a collecting bin. The apparatus consists of a plurality of adjacent chambers mounted on the periphery of a large drum that rotates past the wetting section, a filtration section and finally an agitation section in which hammers strike successive chambers to agitate and thereby remove collected contaminants.

11 Claims, 5 Drawing Figures

United States Patent [19]
Christensen et al.
[11] 3,754,378
[45] Aug. 28, 1973
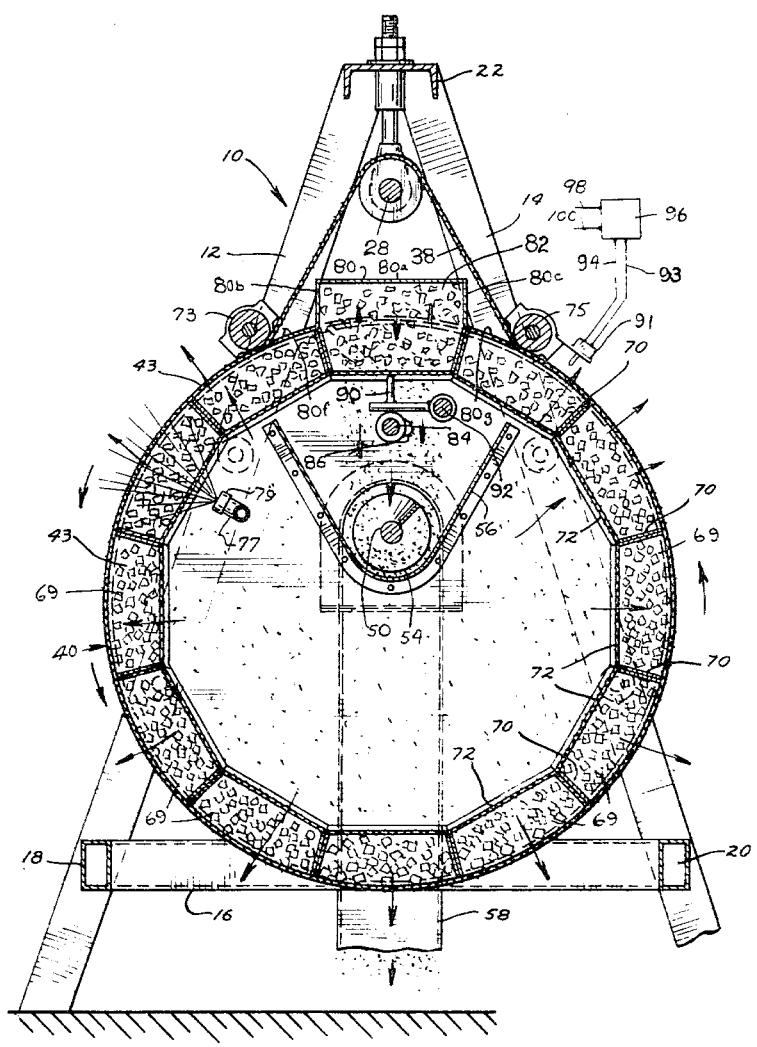

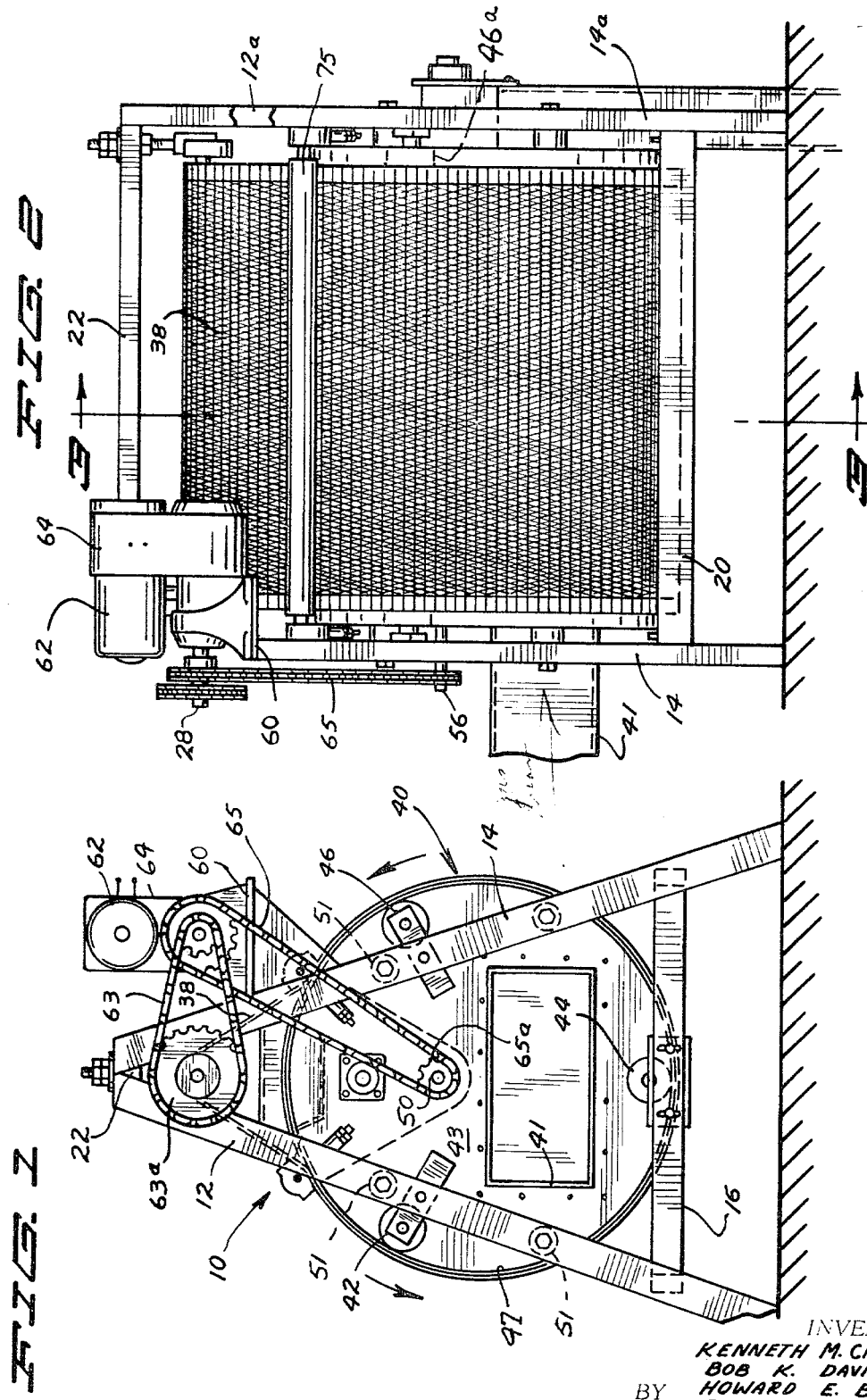

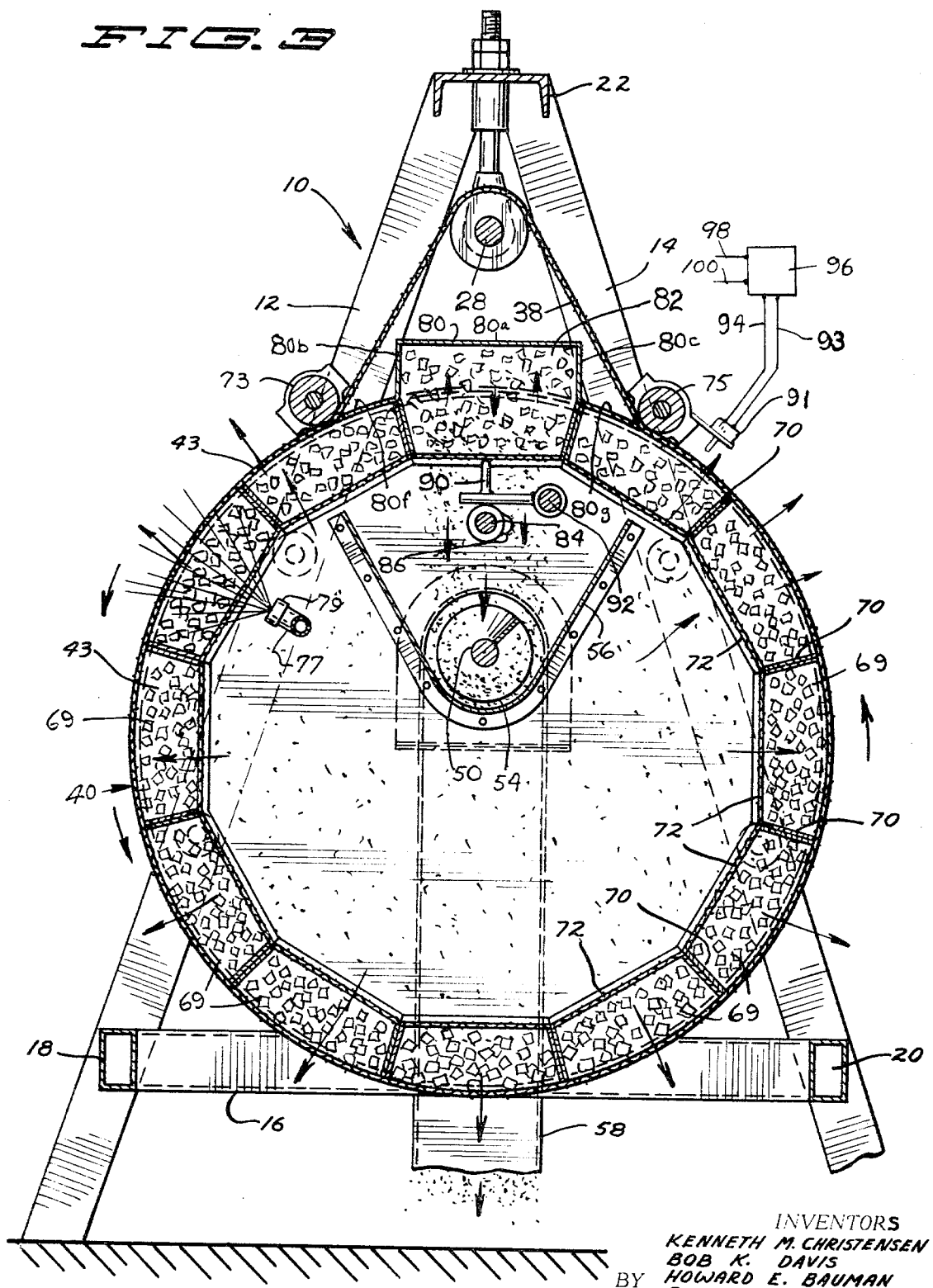

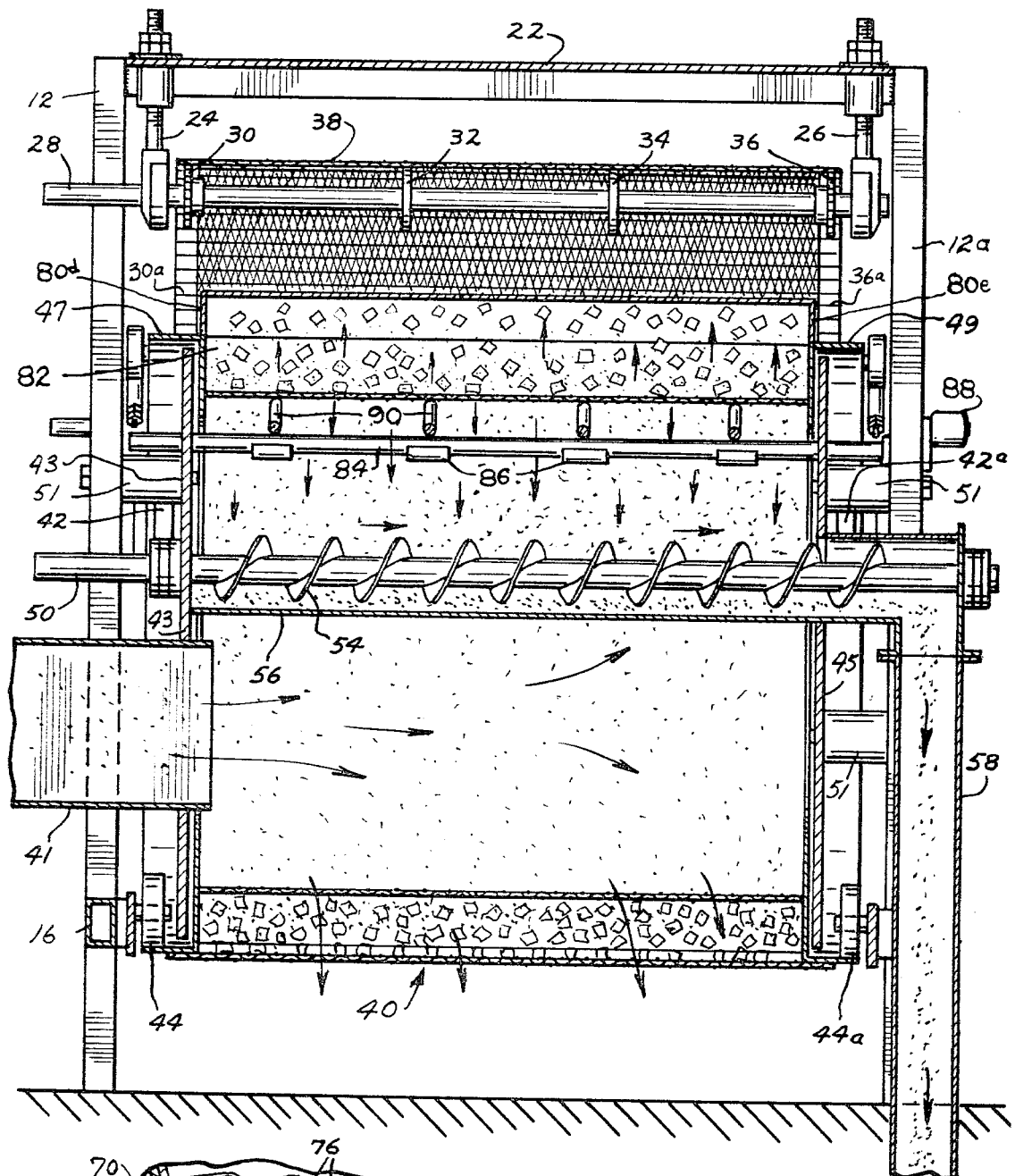

APPARATUS FOR REMOVING DUST FROM AN AIR STREAM

This is a continuation, of application Ser. No. 764,043, filed Sept. 27, 1968 now abandoned.

This invention relates to filtration equipment and more particularly to a filter of the type used for removing suspended solids such as dust or other contaminants from a gas.

A great many filters are currently available for removing suspended particulate materials from gas. While bag filters are one of the most efficient they are only suitable for dry dust because of blinding of the filter cloth caused by moisture. In addition, they cannot be used at relatively high temperatures. Thus, fiberglass must be used at temperatures over 550° F. and metal at temperatures over 1000° F. The bags, moreover, require constant replacement. This is not only expensive, but replacement of the bags is a time-consuming task and because bags must be cleaned by back flushing which requires a partial shut-down, the equipment must have a substantially greater capacity than that needed to handle expected operating conditions. Also bags cannot operate at equivalent velocities so require more surface area, i.e., the filter medium must have a very much larger cross sectional area. Bags, moreover, are subject to malfunction in high humidity conditions.

Another well-known filter consists of a chamber filled with particles such as sand or gravel. Gas is passed through the bed during operation. Sand or gravel is removed from the chamber and discarded after it has become contaminated with dust. These filters also have certain operating deficiencies, the most notable of which is poor filtration efficiency, a large operating and non-constant back pressure, a marked tendency for the bed to become filled or blocked by the solid particulate material that has been removed from the stream, and the difficulty encountered in cleaning and recovering particulate material from the filter medium.

A filter must, of course, remove contaminants with a high degree of efficiency during normal operation, preferably above that level needed to meet legal requirements since operating abnormalities such as sudden increases in the flow rate will increase the load of the equipment. Accordingly, an added margin of safety is important in designing an effective filter. Materials from which the filter is constructed should be corrosion-resistant and otherwise adequate for handling the contaminants present. The initial cost must, of course, be balanced against the cost of operation.

The equipment should be as maintenance-free as possible. If plugged by the contaminants, the common practice at present is to bypass the filter and just send the gas up the stack while things are being fixed. This, of course, is a substantial disadvantage with much of the equipment presently available.

Concerning the size of particles removed it is important to note that small size differentials cause substantial differences in particle weight. For example, a 10 micron particle of a substance weighs about 1000 times as much as a 1 micron particle of the same substance. If a gas stream has a number of fairly large particles in it, a collector that removes only the large particles may still show a very high efficiency on the basis of weight percent but in the case of a dust containing only small particles, efficiency may be close to zero.

In view of the problems of efficiently removing contaminants from a gas and the shortcomings of prior equipment, the invention has the following objectives and advantages: (a) the ability to efficiently remove large and small suspended particulate material from a gas stream; (b) the provision of a multiplicity of thin layers of a particle trapping liquid distributed over a relatively large surface area with a means for effectively removing and recovering trapped dust from the filter medium; (c) the ability to operate over a wide range of temperatures; (d) the ability to operate continuously with no requirement for back-flushing; (e) the ability to operate with a relatively low back pressure across the filter (typically on the order of 3 – 5 inches of water at a flow rate through the filter of 500 linear feet per minute); (f) continuous operation without blockage of the filter element; (g) a provision of a microscopically thin layer of a trapping liquid within the filter medium and a means for evaporating the liquid and later removing the trapped solids; (h) a filter element composed of a multiplicity of granules with a provision for agitating the granules only when the trapped contaminants are in removable condition; (i) a filter element which will resist high temperatures and corrosion and (j) the ability to reliably handle gas streams with suspended particulates at high humidity levels.

These and other more detailed and specific objects will become apparent in view of the following specification and drawings wherein:

FIG. 1 is an end elevational view of an apparatus embodying the invention.

FIG. 2 is a side elevational view of the apparatus.

FIG. 3 is a vertical cross sectional view taken on line 3—3 of FIG. 2 on a somewhat larger scale.

FIG. 4 is a longitudinal vertical sectional view of the apparatus of FIG. 3 on a somewhat reduced scale relative to FIG. 3.

FIG. 5 is a partial transverse sectional view on a greatly enlarged scale showing the particle collection bed within two adjacent cells.

Briefly stated, the present invention provides an improved filtering apparatus of the type employed for removing suspended particulate material from a gas stream. The apparatus consists of a filter medium or bed preferably composed of a porous bed of material, typically a multiplicity of bodies such as free granules, balls or cubes.

When granules are used they are placed in a compartment through which the gas stream is passed. A duct communicates with the compartment for transferring the gas-containing suspended material through the filter medium. A provision is made for wetting the filter medium with a liquid to form thin layers of a liquid on the surfaces of the filter medium. The liquid layer is formed intermittently. Each time a layer is formed, the flow of dust containing gas through the filter medium evaporates all or a portion of the liquid layer as the dust particles become deposited on the granules. The liquid layer is thus reduced ed during operation due to evaporation. The degree of drying to be accomplished is described below. A device is operatively associated with the filter for removing the dust trapped on the surfaces after a substantial portion of the liquid deposited in the filter medium has been evaporated and the particles are thus in a substantially dry condition.

The term "filter medium" as used herein means an element composed of one or more parts extending across the stream of dust-laden air and having sufficient surface area to contact much of the duct in the stream.

The term "porous bed" means a filter medium having random channels extending through it with sufficient void area to permit the air stream to pass readily through the filter.

The wetting of the filter medium can be accomplished by any known means, for example by dipping or spraying. Spraying is, however, preferred. Other means for depositing the liquid such as by blowing a liquid into the filter medium can be used provided the surfaces of the granules become covered. It is preferred that no more liquid be applied than the granules can hold, (i.e., without moisture dripping from the filter medium).

The period during which the contaminated dust stream flows through the filter medium will vary depending upon the size and nature of the filter and the composition of the gas stream. In the preferred mode of operating the equipment, the gas stream is run through the filter medium until the filter medium is almost completely dry, i.e., until almost all of the trapping liquid has been removed from the surfaces of the granules by evaporation. At this point, the filter medium is subjected to agitation designed to remove the trapped contaminant from the surface of the granules.

The degree to which drying of the filter medium is carried will now be described. Agitation of the filter medium and removal of collected particulate material is preferably begun just before the last portion of moisture has been removed from the surfaces of the granules but it is only necessary that contaminant particles that have collected on the surfaces of the granules be in a removable condition. In some cases this will occur while the granules are still fairly wet (and the filtration efficiency is still at a high level) since some collected materials can be removed as a wet self-supporting sheet. In the case of most materials, however, in order to effect a suitable separation, a deposited layer should be substantially dry. It should also be recognized that it is undesirable to reduce the moisture content of the filter medium to complete dryness because of the resultant drop in filtration efficiency.

Agitation is preferably performed with an agitator that is operatively connected to the granules for subjecting them to vigorous movement. The agitator in one preferred form of the invention is composed of a plurality of hammers mounted to periodically strike a selected portion of the filter. This causes the particles to hit the walls of the container and other granules within the container thereby removing the collected particulate material from the surface of the granules.

In addition to providing a filtering apparatus the present invention also concerns a process for removing particulate materials from a gas stream. This process consists briefly of wetting the surfaces of the filter medium to provide a multiplicity of thin liquid trapping films. A gas that contains contaminants is then forced through the filter medium. As the gas passes through the filter medium, the contaminants are trapped on the wetted surfaces of the particles. In the preferred form of the invention, gas is passed through the filter medium until all or a substantial portion of the liquid has been evaporated thereby converting the trapped contaminants to a removable condition at which point they are usually but not necessarily substantially dry. The trapped contaminants are then removed from the filter medium.

The process is preferably run as a continuous cycle in which the filter medium is distributed as an endless loop. During operation, one section of the loop is wetted, another section is employed for filtration and in a third section the collected contaminants are removed from the filter medium.

To control the speed of movement of the filter past the wetting and contaminant removal stations, the humidity condition of the gas escaping through the filter medium is continuously monitored to determine how much liquid remains in the filter medium. The humidity thus sensed is used to control the point in time at which the contaminants are removed from the surface of the filter. The contaminants are in this way removed from the filter medium when the humidity of the escaping gases drops below a predetermined value.

The invention will be described by way of example.

In the drawings a filter embodying the invention is designated by the numeral 10. It includes a supporting framework composed of inclined supporting columns 12 and 14 at one end and 12a and 14a at the other end. These columns are joined at their upper ends to a horizontally disposed longitudinally extending beam 22. Extending between the lower ends of the columns is a cross member 16 and two longitudinally extending frame elements 18 and 20.

The drum screen support and drive will now be described in connection with FIG. 4. Secured to and extending downwardly from the beam 22 are two longitudinally spaced journal supports 24 and 26, each of which is threaded at its upward end for vertical adjustment relative to beam 22. Mounted for rotation within the journals 24 and 26 is a drive shaft 28 having a sprocket 30 at one end, two centrally located supporting disks 32 and 34 and a sprocket 36 at its other end.

Entrained over the sprockets 30 and 36 and the disks 32 and 34 is an endless woven mesh screen or belt having open woven sprocket openings 30a and 36a along each edge thereof. These openings are entrained over the sprockets 30 and 36 respectively.

The lower portion of the belt 38 is entrained over a large horizontally disposed drum 40 which is mounted for rotation upon six rolls of which 42, 44 and 46 are secured respectively to one end of the framework to support one end of the drum and rolls 42, 44a and 46a are secured to the other end thereof. As seen in the figures, the drum 40 is provided with circular extensions 47 and 49 upon which the supporting rolls are engaged.

During operation, the gas stream containing dust is introduced into the drum through an inlet duct 41 that communicates through the end wall 43 at the left end of the apparatus. A similar end wall 45 is provided at the right end of the drum 40. The walls 43 and 45 are secured to the supporting framework by brackets such as those designated 51 in FIGS. 1 and 4.

Mounted for rotation within the drum 40 is a horizontally disposed auger shaft 50 having a helical flight 54. The auger is mounted within a trough 56 and communicates at its right end as seen in FIGS. 3 and 4 with a collection duct 58.

The drive mechanism for the drum and belt 38 will now be described with particular reference to FIGS. 1 and 2. As seen in the figures, a motor support stand 60 is mounted on the framework adjacent to the left end of the apparatus. The motor 62 transmits power to the auger through variable speed transmission 64 and drive chain 65 that is entrained at its lower end over sprocket 65*a* which is itself affixed to the end of the auger shaft 50. Power is transmitted to the drum by means of a drive chain 63 entrained over a sprocket 63*a* affixed to the end of the shaft 28. Thus, during operation, the motor 62 drives the belt 38 which acts as an endless driving element and also as a gas outlet as will be described below.

As can be seen best in FIGS. 3 and 5, the drum 40 is divided into a plurality of circumferentially distributed longitudinally extending compartments 69 which are separated from one another by partitions 70. Between the inward edges of the partitions 70 are secured screens 72. The belt 38 is held tightly against the outward surface of the compartments 69 and defines their outer wall throughout the entire circumference of the drum 40 except for the portion of the drum located between idler rolls 73 and 75, each of which is suitably journalled for rotation in its position to press the belt 38 firmly against the upper aspect of the drum 40.

Within the compartments 69 is a filter bed made up of generally rectangular granules 74 consisting of an organic polymer such as polystyrene cubes about ⅛ inch square.

During operation, the dust passing into the drum 40 through the duct 41 will strike a thin layer of water 76 that has been applied to the surface of the granules 74 by means of a spray gun 77 having a plurality of longitudinally spaced nozzles 79 distributed along its length. The nozzles 79 can be of any suitable type adapted to produce a fine spray or fog. As seen in FIG. 3, the efflux from the nozzles 79 is projected into each of the compartments 69 as the drum 40 rotates in a counterclockwise direction.

The dust, entrained in the air stream passing into the drum through duct 41, will be trapped on the multiplicity of liquid covered surfaces within the bed. As the granules become coated with dust particles, the liquid will, of course, evaporate. In the preferred mode of operation, the speed of the drum 40 is changed by adjusting the speed changer 64 until the granules within each compartment 69 become almost dry. As each compartment reaches its uppermost position above the trough 56. In this way, the quantity of dust escaping from the apparatus will be minimized while the dust collecting efficiency is maintained at a high level. The mechanism employed for removing dust particles from the granules 74 will now be described.

As seen in FIG. 3, a cover 80 is provided at the top of the drum 40. The cover 80 includes a horizontally disposed top section 80*a* vertically disposed and longitudinally extending side wall sections 80*b* and 80*c* and end sections 80*d* and 80*e* (FIG. 4). Walls 80*b* and 80*c* project longitudinally of the drum and are bent circumferentially at their lower edges to form sections 80*f* and 80*g* that cover all of the upper aspect of the drum which is not contacted by the belt 38.

It can be seen that the walls 80*a* through 80*c* together with the adjacent partition 70 and the screen 72 define a chamber 82 having about twice the height of each of the compartments 69. This accommodates the granules during agitation as will be described below. The mechanism employed for agitating the granules for the purpose of removing accumulated dust particles will now be described with reference to FIGS. 3 and 4.

Mounted for rotation within the drum 40 is a longitudinally extending cam shaft 84 to which is secured longitudinally distributed cam lobes 86. The shaft 84 is turned by an electric motor 88 (FIG. 4). As the shaft rotates, the cams 86 contact hammers 90, each of which is pivotally mounted upon longitudinally extending shaft 92 (FIG. 3). The hammers repeatedly strike screens 72 as they pass beneath the cover 80 thereby subjecting the granules 74 to violent agitation. The granules rise to the top of cover 80 as they are tossed about in highly turbulent condition. As the particles strike one another, the dust collected on their surfaces is removed. The dust falls downwardly through the screen 72 and into the trough 56 where it is carried to an outlet duct 58 by an auger 50.

The control mechanisms employed for regulating the operation of the apparatus will now be described in connection with FIGS. 1, 2 and 3.

As seen in FIG. 3, a humidity sensor such as a continuously sensing psychrometer 91 is wired by conductors 93 and 94 to an electrical control circuit 96 and of any suitable known construction which is in turn connected by conductors 98 and 100 to the variable speed transmission 64. When, during operation, the humidity falls below a certain selected value as sensed by the psychrometer 91, the control 96 will speed up the drum rotation thereby preventing complete dessication of the material deposited on the surfaces of the granules 74. If, however, the moisture content of the air passing through the last of the compartment 69 adjacent to the roll 75, the motor control 96 will change the setting of variable speed transmission 64 so as to increase the speed of the drum. In this way, the granules 74 as they approach the rotation mechanism will almost reach dryness. Accordingly, the accumulated coating of dust can be readily removed from the granules as they are bounced about in the compartment 80.

The invention can better be understood by reference to the following example:

EXAMPLE I

A stream of air traveling through a duct at the rate of 10,000 CFM containing approximately 15 grains/-cu.ft. of dust is introduced to an apparatus as described in the drawings. The granules 74 consist of polystyrene granules having a cubic shape and being about ⅛ inch on each side. Each compartment 69 is about 3 inches thick. The drum 40 is rotated at a speed of about 1 rpm. such that each compartment is approaching dryness when the agitation station is reached thereby providing a total exposure time of each bed to the dust containing air stream of about 1 minute. The auger 50 is rotated at a speed of about 100 rpm. and the shaft 84 of the agitating mechanism is rotated at a speed of 100 rpm. Water is sprayed onto the granules through nozzles 79 at the rate of about ½ gallon per minute.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A process for filtering suspended particulate material from a gas stream comprising: cyclically,
   a. passing the gas stream thicknesswise through a bed of filter material which has exteriorly exposed dust collecting surfaces wet with a vaporizable liquid in a first zone thereof in order to trap the particulate material on said wet, exteriorly exposed dust collecting surfaces;

conducting step (a) for a sufficient time to substantially dry said wet, exteriorly exposed dust collecting surfaces by evaporating said vaporizable liquid therefrom and collect particulate material in the bed b. agitating the bed of filter material to free the trapped particulate material therefrom in a second zone;

c. collecting and removing the particulate material freed from the bed of filter material beneath the second zone;

d. rewetting the bed in said first zone with said vaporizable liquid; and continuously relatively moving the bed with respect to said zones so that all portions of the bed successively and intermittently become the first zone and the second zone.

2. The process of claim 1 further including sensing the magnitude of vapor presence adjacent the bed at a site where the magnitude of vapor presence directly affects whether the filter material will have a substantially dried condition upon becoming within said second zone, and adjusting the rate of said relative moving in response to said sensing when such adjustment is needed to ensure meeting said condition.

3. The process of claim 2 wherein the bed is a hollow cylinder and said relative moving is carried out by rotating said bed about the longitudinal axis thereof.

4. A filter apparatus for removing suspended particulate material from a gas stream, comprising:

a compartment connected to the apparatus as a part thereof;

a bed of filter bodies in the compartment having exposed surfaces for collecting said material and defining a plurality of passages communicating therethrough between opposite faces of the bed, thicknesswise of said bed;

a plurality of treating stations in the apparatus disposed adjacent the bed and each arranged to operate thereupon, said stations including:

a. means in the apparatus for supplying a vaporizable liquid onto the bed of filter bodies to wet the exteriorly exposed particle collecting surface in a first zone in the transverse direction across the bed;

b. means connected to the apparatus for supplying a gas having suspended particulate material to one face of the bed, under pressure, so as to force the suspended particulate material-laden gas through said plurality of passages and collect particulate material in the bed, and to evaporate said vaporizable liquid from the surfaces of the bodies;

c. means in the apparatus adapted to engage and impart motion to the bed for agitating the filter bodies in the bed in a second zone of said bed to free therefrom particulate material captured on said particulate collecting surfaces while wetted;

d. means in the apparatus adjacent said compartment for collecting and removing the particulate material freed in the second zone of the apparatus;

means in the apparatus operatively connected to the compartment for imparting relative movement between the bed and the treating station so that all portions of said bed successively and intermittently pass through said first zone and said second zone;

there being a sufficient interval of drying between said first zone and said second zone, in the direction of said relative movement to permit the wetted dust collecting surfaces of the filter bodies to have become substantially dried before being wetted again; and the station at which the vaporizable liquid impinges upon the bed of filter bodies to wet said first zone being physically separated from said second zone so that the substantially dried filter bodies in said second zone are not counterproductively wetted while particulate material is being freed therefrom.

5. The apparatus of claim 4 wherein the bed of filter bodies comprises a bed of discrete, individual filter granules having said passages defined thereamong and wherein said agitating means comprises a beater arranged to beat the bed in the second zone thereof to turbulently agitate the discrete, individual filter granules to free the captured particulate material from the exteriorly exposed surfaces thereof.

6. The apparatus of claim 4 wherein the second zone of the filter is disposed generally horizontally and the means for collecting and removing the particulate material from the second zone comprises trough means disposed under the second zone to catch the freed particulate material and conveyor means for removing particulate material caught in the trough from the apparatus.

7. The apparatus of claim 4 wherein the bed is a hollow cylinder and the agitating means is disposed between the lower, internal face of the second zone thereof and the trough means.

8. The apparatus of claim 4 further including:

means for varying the rate of said relative motion;

vapor sensing means disposed for sensing the magnitude of vapor presence adjacent the bed at a site where the magnitude of vapor present directly affects whether the filter material will have a substantially dried condition upon becoming within said second zone; and means for automatically adjusting the rate of said relative motion in response to sensations by said vapor sensing means that adjusting of said rate is needed to ensure meeting said condition.

9. The apparatus of claim 4 wherein said bed is a hollow cylinder and said means for supplying a gas having suspended particulate material communicates with the center of the hollow cylinder bed to supply said gas to the internal face of the bed.

10. The apparatus of claim 9 wherein the second zone of filter material is disposed generally horizontally and the means for collecting and removing the particulate material from the second zone comprises trough means disposed under the second zone to catch the freed particulate material and conveyor means for conveying particulate material caught in the trough from the apparatus.

11. The apparatus of claim 10 wherein the bed is a hollow cylinder and the agitating means is disposed between the lower, internal face of the second zone and the trough means.

* * * * *